(12) United States Patent
Pohlmann et al.

(10) Patent No.: US 9,345,198 B2
(45) Date of Patent: May 24, 2016

(54) RESIDUE CHOPPING AND DISTRIBUTION ARRANGEMENT FOR A COMBINE HARVESTER

(71) Applicant: Deere & Company, Moline, IL (US)

(72) Inventors: Norbert Pohlmann, Bettendorf, IA (US); Mark L Pearson, Leclaire, IA (US); Joel D Ferris, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/180,896

(22) Filed: Feb. 14, 2014

(65) Prior Publication Data

US 2015/0230408 A1    Aug. 20, 2015

(51) Int. Cl.
| A01D 41/12 | (2006.01) |
| A01F 29/06 | (2006.01) |
| A01F 17/00 | (2006.01) |
| A01F 29/12 | (2006.01) |
| A01F 12/40 | (2006.01) |

(52) U.S. Cl.
CPC ............ A01F 29/06 (2013.01); A01D 41/1243 (2013.01); A01F 12/40 (2013.01); A01F 17/00 (2013.01); A01F 29/12 (2013.01)

(58) Field of Classification Search
CPC ......... A01F 12/40; A01F 29/06; A01F 29/12; A01F 17/00; A01D 41/1243
See application file for complete search history.

(56) References Cited

U.S. PATENT DOCUMENTS

| 4,617,942 | A | * | 10/1986 | Garner .......................... 460/112 |
| 5,082,186 | A | * | 1/1992 | Bruns .......................... 239/682 |
| 6,572,035 | B1 | | 6/2003 | Pfeiffer |
| 6,602,131 | B2 | | 8/2003 | Wolters |
| 6,769,980 | B2 | | 8/2004 | Wolters et al. |
| 2002/0077163 | A1 | * | 6/2002 | Buermann et al. ............ 460/112 |
| 2003/0003974 | A1 | * | 1/2003 | Niermann et al. ............ 460/111 |
| 2003/0109294 | A1 | * | 6/2003 | Wolters et al. ................ 460/112 |
| 2003/0114207 | A1 | * | 6/2003 | Wolters et al. ................ 460/111 |
| 2004/0127271 | A1 | * | 7/2004 | Wolters et al. ................ 460/112 |
| 2005/0124399 | A1 | * | 6/2005 | Holmen ........................ 460/111 |
| 2007/0026915 | A1 | * | 2/2007 | Anderson et al. ............. 460/112 |
| 2009/0156277 | A1 | * | 6/2009 | Benes et al. .................. 460/112 |
| 2011/0028193 | A1 | * | 2/2011 | Murray et al. ................. 460/111 |
| 2012/0264493 | A1 | | 10/2012 | Matousek et al. |

* cited by examiner

*Primary Examiner* — Matthew D Troutman
*Assistant Examiner* — Adam Behrens

(57) ABSTRACT

A residue chopping and distribution arrangement (48) for a combine harvester (10) comprises a first straw chopper (50) and a second straw chopper (52) arranged side by side and expelling the chopped straw laterally. A first chaff spreader (106) located in front of the first straw chopper (50) is driven by a first drive shaft (68) that also drives a first rotor (66) of the first straw chopper (50). A second chaff spreader (108) located in front of the second straw chopper (52) is driven by a second drive shaft (100) that also drives a second rotor (92) of the second straw chopper (52).

8 Claims, 2 Drawing Sheets

RESIDUE CHOPPING AND DISTRIBUTION ARRANGEMENT FOR A COMBINE HARVESTER

FIELD OF THE INVENTION

This invention relates to agricultural harvesters. More particularly it relates to a crop residue chopping and distribution arrangement for a combine harvester.

BACKGROUND OF THE INVENTION

Agricultural harvesters typically include a self-propelled combine with crop threshing, separating, or cleaning equipment, and a header attached to the front of the vehicle that the vehicle carries through the field. The crop standing or lying in the field is collected by the header, which can be a platform, pick-up or corn header, and threshed and separated in the combine in order to remove the grain from the straw and other residues. The straw is either laid down in the field in a swath or chopped and distributed on the field over the working width of the header. The threshed or separated grain is cleaned in a cleaning unit and the chaff residues are also distributed over the field, either by a separate chaff spreader or by the residue distribution arrangement of the straw chopper.

It was proposed to provide two separate straw choppers on a combine (US 2012/0264493 A1), both choppers having a rotor with a rotational axis oriented in the forward direction of the combine. The straw enters the straw choppers from the top and is expelled generally to the side, increasing the achievable distribution width with respect to known straw choppers with a transversely oriented rotor axis. The chaff residues from the cleaning unit are also fed into the straw chopper by a separate fan drawing the chaff through a second inlet at the front of the straw chopper housing. The fan can be mounted inside or outside the straw chopper housing and has its own drive motor.

The separate drive of the fan requires contributes significantly to the cost and weight of the straw chopper arrangement. The air flow necessary to suck the chaff from the cleaning unit into the straw chopper housing creates undesired turbulences in the straw chopper housing contributing to a non-uniform spreading of the crop residues over the field.

It is thus an object of the present invention to provide a residue chopping and distribution arrangement for a combine avoiding or reducing the mentioned disadvantages.

SUMMARY OF THE INVENTION

According to a first aspect of the invention, a residue chopping and distribution arrangement for a combine comprises:
- a first straw chopper with a first straw chopper housing and a first rotor within the first straw chopper housing, the first rotor having straw chopper knives distributed around its circumference, the first rotor connected to a first drive shaft which is supported within the first straw chopper housing to rotate around a first axis and connected to a first drive mechanism,
- a second straw chopper with a second straw chopper housing and a second rotor within the second straw chopper housing, the second rotor having straw chopper knives distributed around its circumference, the second rotor connected to a second drive shaft which is supported within the second straw chopper housing to rotate around a second axis and connected to a second drive mechanism, wherein the first axis and the second axis are parallel to a forward direction of the combine and laterally offset of each other and the drive mechanisms are adapted to drive the first rotor and the second rotor during operation in opposite directions such that the parts of the rotors beneath their respective axis move laterally outwards and expel chopped straw through a respective first and second outlet over a field, further comprising a first chaff spreader adapted to spread chaff over a field, the first chaff spreader located in the forward direction of the combine in front of the first rotor, the first chaff spreader coupled to the first drive shaft, and a second chaff spreader adapted to spread chaff over the field, the second chaff spreader located in the forward direction of the combine in front of the second rotor, the second chaff spreader coupled to the second drive shaft.

In other words, a straw chopping and chaff distributing arrangement for a combine harvester is proposed, wherein two straw choppers are mounted side by side and have their longitudinal and rotational axes parallel to the forward direction of the combine. The straw choppers are mounted in respective housings, which can be separated or joined in one common housing. The straw choppers receive straw from a threshing and separating unit of the combine at their upper inlets and expel it over the field at their lateral outlets. At the front end of the straw chopper housings, two respective chaff spreaders are mounted, for receiving chaff residue from a cleaning unit of the combine and distributing it laterally over the field. The chaff spreaders are driven by the drive shaft of the respective straw chopper. Thus, the straw chopping and distributing operation is performed by the straw choppers, while the chaff is spread by the chaff spreaders, and thus not sent through the straw choppers.

Preferably, the first straw chopper housing has a closed front wall between the first chaff spreader and the first rotor and the second straw chopper housing has a closed front wall between the second chaff spreader and the second rotor.

The first chaff spreader can have a number of paddles distributed around the first drive shaft and the second chaff spreader can have a number of paddles distributed around the second drive shaft. The paddles are preferably radially oriented with respect to the first or second drive shaft. They can be generally flat with a forwardly angled section at the edge facing forward in the forward direction of the combine.

The first straw chopper housing preferably has a first funnel-shaped straw-introducing part above the first rotor, while the second straw chopper housing has a funnel-shaped straw-introducing part above the second rotor.

The straw chopper housings may comprise a counterknife above first and second axis, respectively.

According to a second aspect of the invention, a combine harvester is provided, comprising:
- a body supported on ground engaging means adapted to move the combine harvester in a forward direction over a field,
- a header for receiving crop from the field,
- a threshing and separating unit for threshing and separating grain,
- a cleaning unit for cleaning grain, and
- a residue chopping and distribution arrangement as described above, wherein the threshing and separating unit has a residue outlet adapted to feed straw to the first and second straw choppers and the cleaning unit has a residue outlet adapted to feed chaff to the first and second chaff spreaders.

DESCRIPTION OF THE PREFERRED EMBODIMENT

Figure 1:
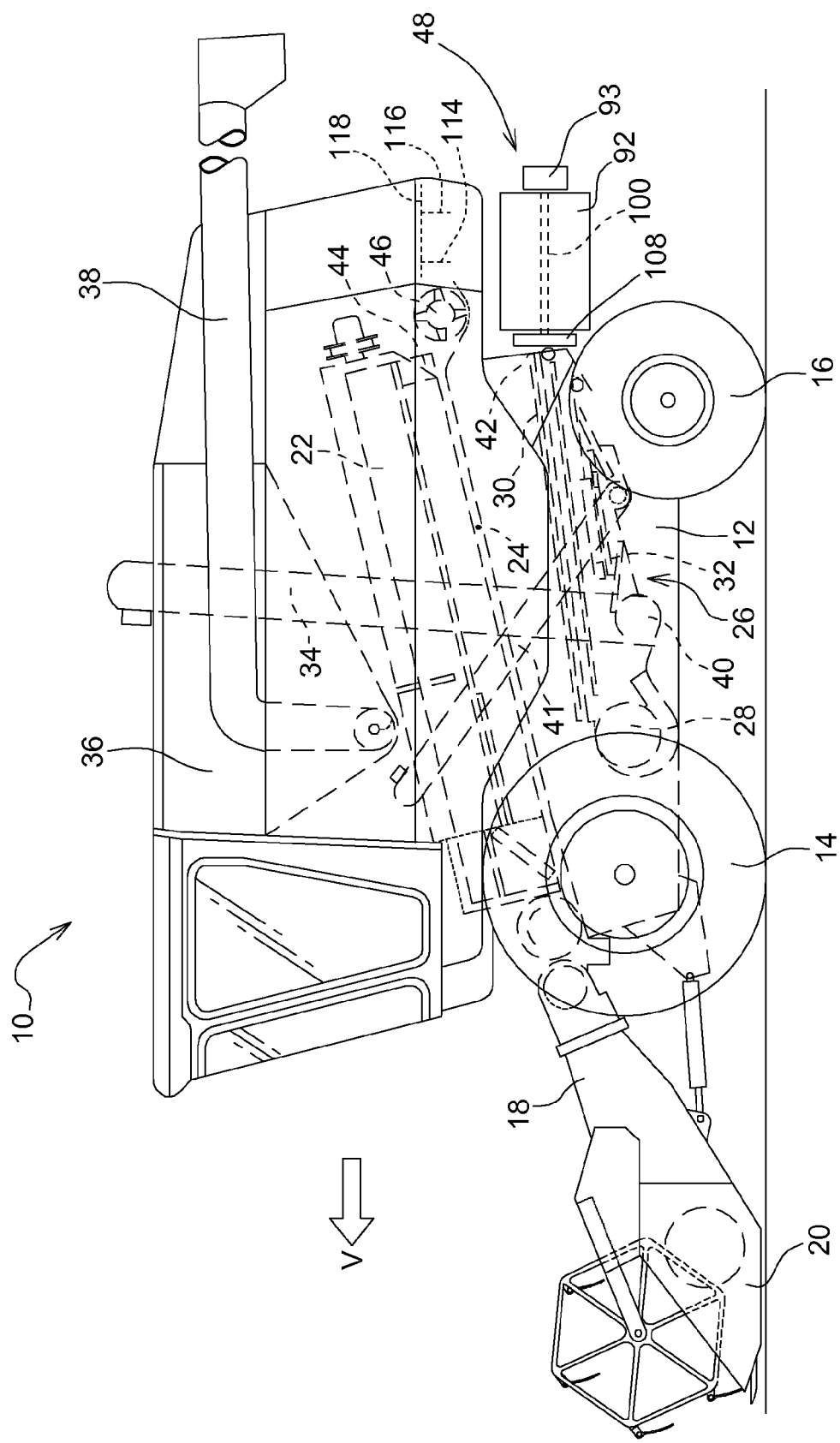
FIG. 1 is a schematical side view of an agricultural combine harvester with a residue chopping and distribution arrangement according to the invention.

In FIG. 1, a self propelled agricultural combine harvester 10 is shown in a lateral view. The combine harvester 10 comprises a body 12 supported on driven front ground engaging means 14 (such as wheels or tracks) and rear ground engaging means 16 (such as wheels or tracks). During a harvesting operation, the combine harvester 10 drives in the forward direction indicated by arrow V, and thus to the left as shown in FIG. 1. On its forward end, body 12 supports a feederhouse 18. On the forward end of the feederhouse 18, a harvesting platform 20 is releasably mounted, such that the harvesting platform 20 can be deposited on a trailer (not shown) and disconnected from the feederhouse 18 for road transport.

During harvesting, the harvesting platform 20 cuts and gathers crop from a field and feeds it to the feederhouse 18. Feederhouse 18 conveys the crop into the interior of the body 12, where it is threshed and separated by a rotary threshing and separating unit 22. Grain passing through a concave or grate 24 of the threshing and separating unit 22 is cleaned in a cleaning unit 26 having a blower fan 28 and an upper sieve 30 and a lower sieve 32. Clean grain passing the lower sieve 32 is deposited by a cross conveyor 40 and an elevator 34 in a grain tank 36 from where it can be unloaded with an unloader conveyor 38 into a transport vehicle. Chaff and grain from the rear end of the lower sieve 32 are fed to a tailings conveyor 41 and re-threshed, either in the threshing and separating unit 22 or in a separate re-thresher unit (not shown). Chaff leaving the rear end of the upper sieve 30 is expelled to the rear by the air flow of the blower fan 28 through a residue outlet 42 for chaff. The threshing and separating unit 22 has a residue outlet 44 for straw, through which the straw is fed to a beater 46.

Figure 2:
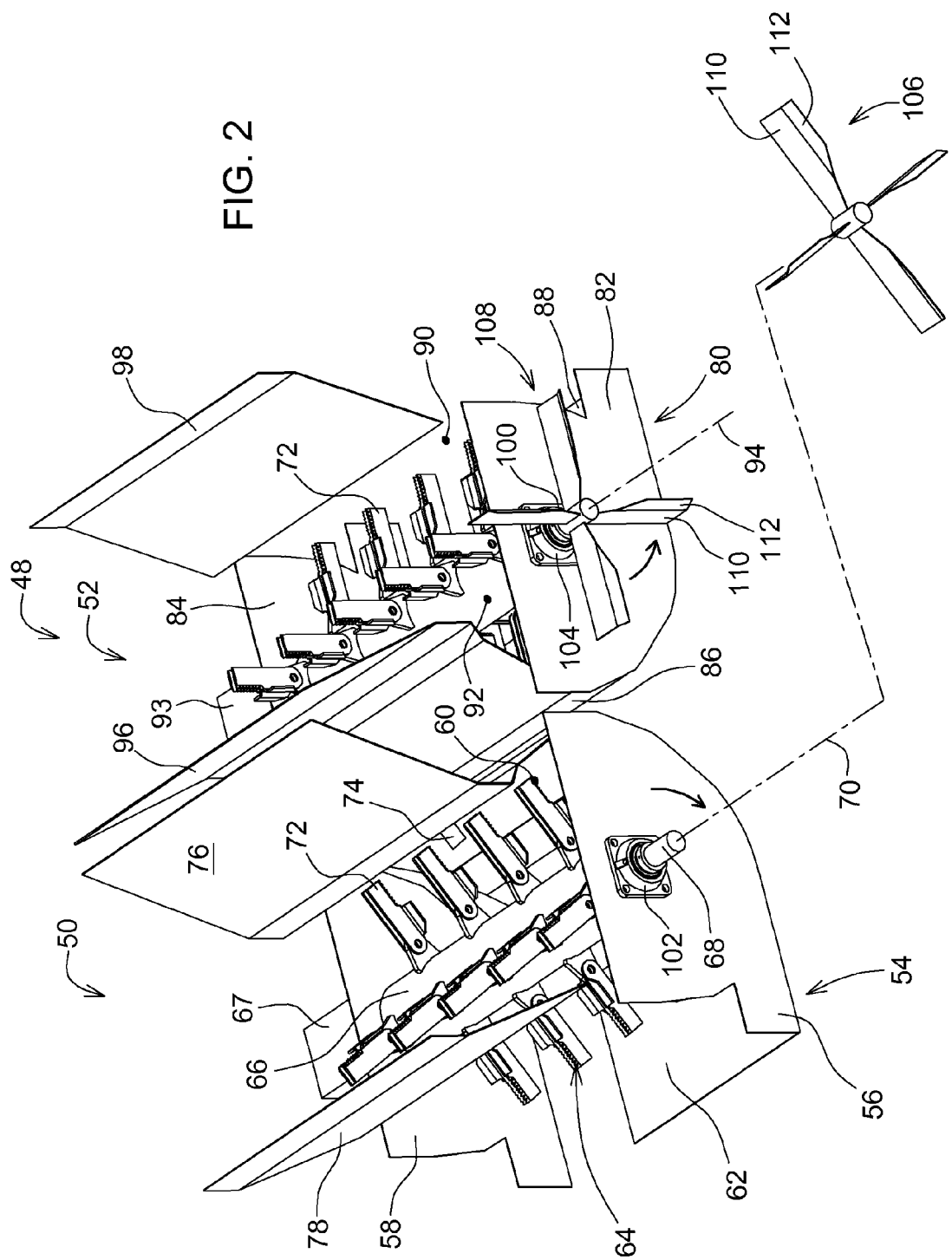
FIG. 2 is a perspective view of the residue chopping and distribution arrangement.

Beneath the residue outlet 44 and downstream the beater, a residue chopping and distribution arrangement 48 is provided, which is shown in more detail in FIG. 2. The residue chopping and distribution arrangement 48 comprises a first straw chopper 50 (disposed on the right as seen in the forward direction V) and a second straw chopper 52, (disposed on the left as seen in the forward direction V).

The first straw chopper 50 comprises a first straw chopper housing 54 with a first front wall 56, a first rear wall 58, a first side wall 60 and a first bottom wall 62. The first side wall 60 and the first bottom wall 62 are formed as a single wall and have a convex shape. Above the first bottom wall 62, a first lateral outlet 64 is formed. A first rotor 66 is rotatably supported in the first straw chopper housing 54 on a first drive shaft 68 having a first rotation axis 70 extending in the forward direction V of the combine harvester 10. The first drive shaft 68 is driven by a first drive mechanism 67 that may comprise a hydraulic motor (not shown) or a mechanical drive connection to a combustion engine (not shown) driving the combine harvester 10. A number of chopper knives 72 are mounted on the first rotor 66 in four axial rows distributed around the circumference of the first rotor 66 for chopping straw. The chopper knives 72 interact with counterknives 74 mounted to the first sidewall 60 and above the first rotation axis 70. A funnel-shaped straw-introducing part with an inner lateral wall 76 and outer lateral wall 78 is provided above the first rotor 66. The inner lateral wall 76 of the funnel-shaped straw-introducing part connects to the upper edge of the first side wall 60. The outer lateral wall 78 of the funnel-shaped straw-introducing part is provided directly above the first lateral outlet 64 and defines the upper edge thereof. During operation, the first rotor 66 rotates clockwise, when seen from the front as in FIG. 2.

The second straw chopper 52 comprises a second straw chopper housing 80 with a second front wall 82, a second rear wall 84, a second side wall 86 and a second bottom wall 88. The second side wall 86 and the second bottom wall 88 are formed as a single wall and have a convex shape. Above the second bottom wall 88, a second lateral outlet 90 is formed. A second rotor 92 is rotatably supported in the second straw chopper housing 80 on a second drive shaft 100 having a second rotation axis 94 extending in the forward direction V of the combine harvester 10. The second drive shaft 100 is driven by a second drive mechanism 93 that may comprise a hydraulic motor (not shown) or a mechanical drive connection to a combustion engine (not shown) driving the combine harvester 10. A number of chopper knives 72 are mounted on the second rotor 92 in four axial rows distributed around the circumference of the second rotor 92. The chopper knives 72 interact with counterknives (not shown) mounted to the second side wall 86 above the second rotation axis 94. The counterknives mounted to the second straw chopper 52 are constructed and arranged in mirror image form to the counterknives 74 disposed in the first straw chopper 50. A funnel-shaped straw-introducing part with an inner lateral wall 96 and an outer lateral wall 98 is provided above the second rotor 92. An inner lateral wall 96 of the funnel-shaped straw-introducing part connects to the upper edge of the second side wall 86. An outer lateral wall 98 of the funnel-shaped straw-introducing part is provided directly above the second lateral outlet 90 and defines the upper edge thereof. During operation, the second rotor 92 rotates counterclockwise, when seen from the front as in FIG. 2.

The first front wall 56 and the second front wall 82 are closed in order to shield the interior of the first straw chopper 50 in the second straw chopper 52, respectively, from the air flow provided by the blower fan 28. The first drive shaft 68 and the second drive shaft 100 however extend and penetrate though the first front wall 56 and the second front wall 82 (respectively), where the first drive shaft 68 and the second drive shaft 100 are supported in bearings 102, 104.

On the part of the first drive shaft 68 in front of the first front wall 56, a first chaff spreader 106 is mounted (shown in dismounted position in FIG. 2, but to be mounted like the second chaff spreader 108). The first chaff spreader 106 is directly mounted to the first drive shaft 68. The first chaff spreader 106 comprises four flat, radially extending paddles 110 having a forwardly angled section 112 at the edge facing forward in the forward direction V of the combine harvester 10.

The second chaff spreader 108 is mounted on the part of the second drive shaft 100 that is disposed in front of the second front wall 82. The second chaff spreader 108 is directly mounted to the second drive shaft 100. The second chaff spreader 108 comprises four flat, radially extending paddles 110 having a forwardly angled section 112 at the edge facing forward in the forward direction V of the combine harvester 10.

The operation of the combine harvester 10 and the residue chopping and distribution arrangement 48 can be described as follows. Straw is expelled through the residue outlet 44 of the threshing and separating unit 22 and fed by the beater 46 into the funnel-shaped straw-introducing parts of the first straw chopper 50 and the second straw chopper 52. The straw is chopped there into small pieces by the chopper knives 72 in cooperation with the counterknives 74 and expelled in a lateral direction through the first lateral outlet 64 and the second lateral outlet 90. The first straw chopper 50 thus distributes the straw to the right side of the combine harvester 10 (seen in the forward direction V) and the second straw chopper distributes the straw to the left side of the combine harvester 10 (seen in the forward direction V). Chaff from the cleaning unit 26 is blown through its residue outlet 42 and then engaged by one of the first chaff spreader 106 and the second chaff spreader 108, which distribute the chaff over the width of the field.

Having described the preferred embodiments, it will become apparent that various modifications can be made without departing from the scope of the invention as defined in the accompanying claims. For example, the rotary threshing and separating unit 22 can be replaced by a tangential threshing drum and straw walkers. In order to achieve a homogenous distribution of the straw over the field, the first lateral outlet 64 and the second lateral outlet 90 can be provided with guide vanes and/or triangular cutouts in the first bottom wall 62 and the second bottom wall 88, as described in US 2012/0264493 A1, U.S. Pat. Nos. 6,572,035 B1, 6,602, 131 B2 or 6,769,980 B2. Finally, crop deflectors 114, 116 that are staggered with respect to each other can be provided above the first straw chopper 50 and the second straw chopper 52, as shown in FIG. 1, in order to uniformly charge the first straw chopper 50 and the second straw chopper 52 with straw. The crop deflectors 114, 116 preferably are triangular, when seen from the front, and laterally and longitudinally (i.e. in the forward direction V) offset from the other. Such crop deflectors 114, 116 are mounted above both the first straw chopper 50 and the second straw chopper 52. The crop deflectors 114, 116 are supported beneath a top wall 118 above the first straw chopper 50 in the second straw chopper 52.

We claim:

1. A combine harvester (10), comprising:
a body (12) supported on ground engaging means adapted to move the combine harvester (10) in a forward direction (V) over a field,
a harvesting platform (20) mounted to the body (12) for receiving crop from the field,
a threshing and separating unit (22) within the body (12) for threshing and separating grain,
a cleaning unit (26) within the body (12) for cleaning grain, and
a residue chopping and distribution arrangement (48) comprising:
a first straw chopper (50) with a first straw chopper housing (54) and a first rotor (66) within the first straw chopper housing (54), wherein the first rotor (66) has chopper knives (72) distributed around its circumference, wherein the first rotor (66) is connected to a first drive shaft (68) which is supported within the first straw chopper housing (54) to rotate around a first rotation axis (70), and wherein the first drive shaft (68) is connected to a first drive mechanism (67),
a second straw chopper (52) with a second straw chopper housing (80) and a second rotor (92) within the second straw chopper housing (80), wherein the second rotor (92) has chopper knives (72) distributed around its circumference, wherein the second rotor (92) is connected to a second drive shaft (100) which is supported within the second straw chopper housing (80) to rotate around a second rotation axis (94), and wherein the second drive shaft (100) is connected to a second drive mechanism (93);
wherein the first rotation axis (70) and the second rotation axis (94) are at least generally parallel to a forward direction (V) of the combine harvester (10) and laterally offset, and wherein the first drive mechanism (67) and the second drive mechanism (93) are adapted to drive the first rotor (66) and the second rotor (92) in opposite directions during operation such that parts of the first rotor (66) that are disposed beneath the first rotation axis (70) and parts of the second rotor (92) that are disposed beneath the second rotation axis (94) move laterally outwards and expel chopped straw through a respective first outlet (64) and a second outlet (90) over a field;
further comprising a first chaff spreader (106) adapted to spread chaff over the field, wherein the first chaff spreader (106) is located in the forward direction (V) of the combine harvester (10) in front of the first rotor (66), and wherein the first chaff spreader (106) is mounted to the first drive shaft (68); and
a second chaff spreader (108) adapted to spread chaff over the field, wherein the second chaff spreader (108) is located in the forward direction (V) of the combine harvester (10) in front of the second rotor (92), and wherein the second chaff spreader (108) is mounted to the second drive shaft (100), and
wherein the threshing and separating unit (22) has a residue outlet (44) adapted to feed straw to the first straw chopper (50) and the second straw chopper (52), and wherein the cleaning unit (26) has a residue outlet (42) adapted to feed chaff to the first chaff spreader (106) and the second chaff spreader (108).

2. The combine harvester according to claim 1, wherein the first straw chopper housing (54) has a closed front wall (56) disposed between the first chaff spreader (106) and the first rotor (66) and wherein the second straw chopper housing (80) has a closed front wall (82) disposed between the second chaff spreader (108) and the second rotor (92).

3. The combine harvester according to claim 1,, wherein the first chaff spreader (106) has paddles (110) distributed around the first drive shaft (68) and the second chaff spreader (108) has paddles (110) distributed around the second drive shaft (100).

4. The combine harvester according to claim 3, wherein the paddles (110) are radially oriented with respect to the first drive shaft (68) or the second drive shaft (100).

5. The combine harvester according to claim 3, wherein the paddles (110) are generally flat with a forwardly angled section (112) at an edge of the paddles (110) that faces forward in the forward direction (V) of the combine harvester (10).

6. The combine harvester according to claim 1, wherein the first straw chopper housing (54) has a first funnel-shaped straw-introducing part above the first rotor (66) and wherein the second straw chopper housing (80) has a funnel-shaped straw-introducing part above the second rotor (92).

7. The combine harvester according to claim 1, wherein the first straw chopper housing (54) comprises counterknives (74) disposed above the first rotation axis (70) and the second straw chopper housing (80) comprises counterknives (74) disposed above the second rotation axis (94).

8. The combine harvester (10) according to claim 1, further comprising crop deflectors (114, 116) disposed between the residue outlet (44) of the threshing and separating unit (22), wherein the crop deflectors (114, 116) are staggered in at least one of a lateral direction and a longitudinal direction.

* * * * *